Aug. 25, 1925.
F. K. FASSETT
WORM GEAR
Filed Dec. 23, 1922 2 Sheets-Sheet 2
1,551,474
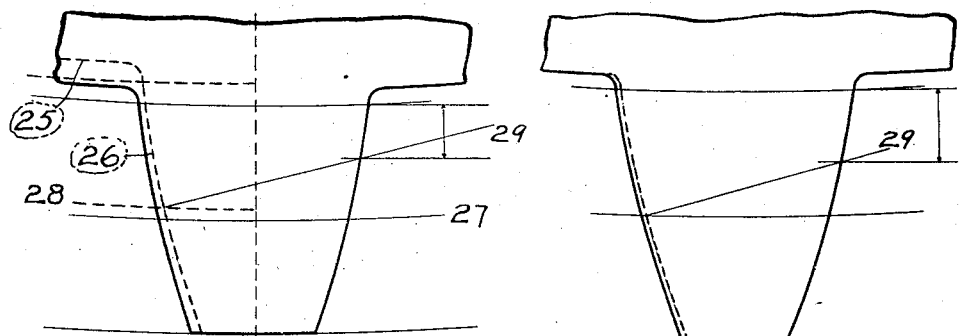
Fig. 5. Fig. 6.
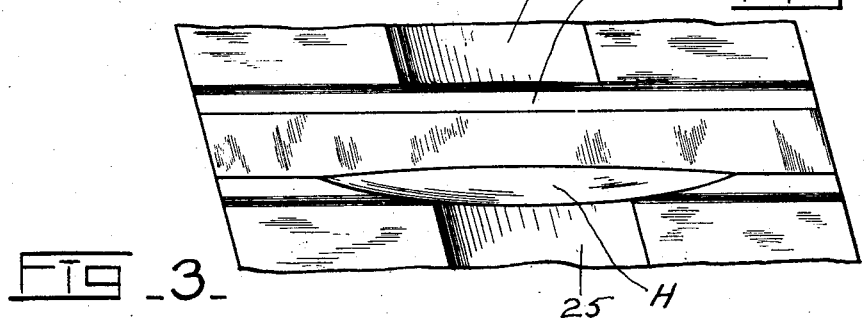
Fig. 3.
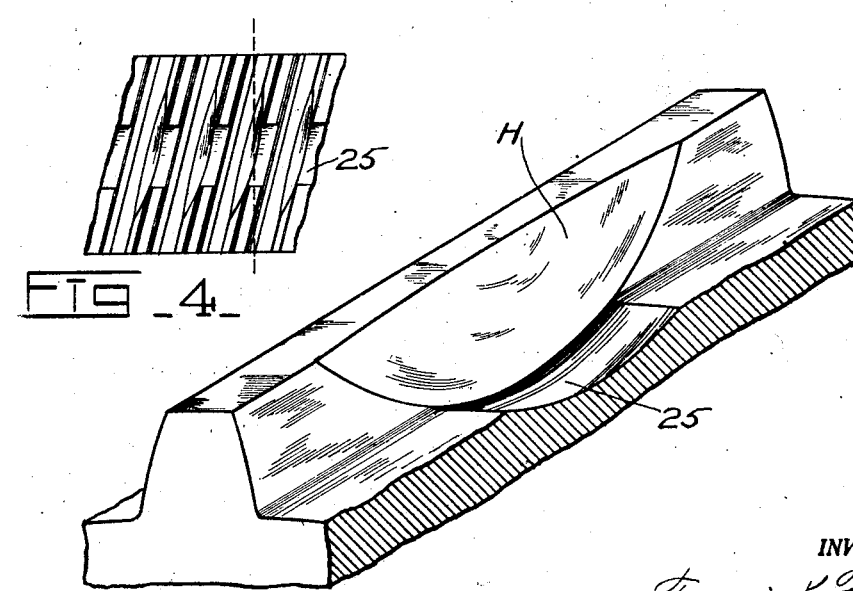
Fig. 4.
Fig. 2.
INVENTOR.
Francis K. Fassett.

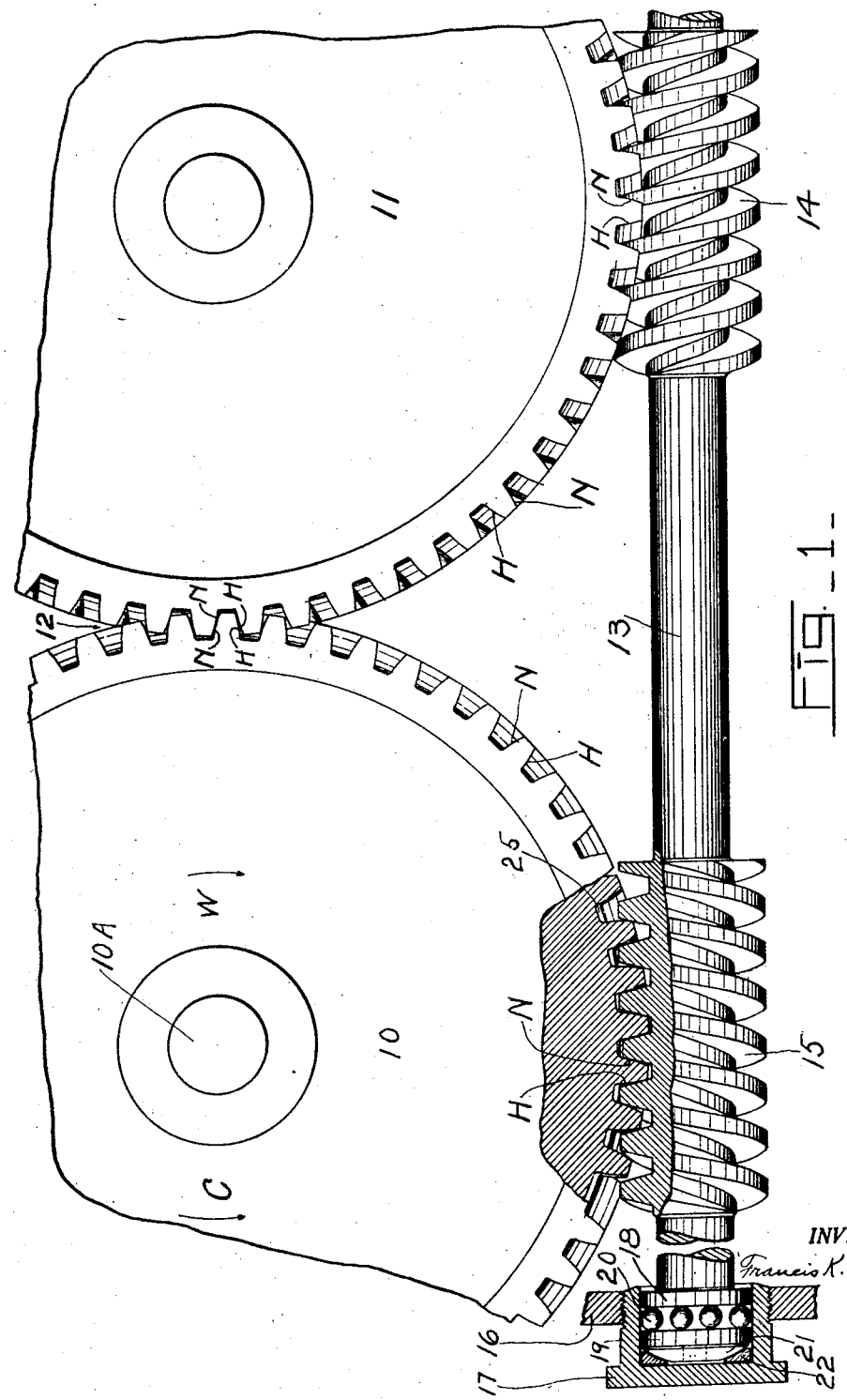

Patented Aug. 25, 1925.

1,551,474

UNITED STATES PATENT OFFICE.

FRANCIS K. FASSETT, OF DAYTON, OHIO.

WORM GEAR.

Application filed December 23, 1922. Serial No. 608,733.

*To all whom it may concern:*

Be it known that I, FRANCIS K. FASSETT, a citizen of the United States, residing at Dayton, in the county of Montgomery and State of Ohio, have invented a new and useful Improvement in Worm Gears, of which the following is a specification.

My invention relates to a worm gear resembling in some particulars what is known as a tandem worm gear; that is, a worm gear comprising two helical spur gear wheels with their teeth in mesh, and two worms, one right and the other left hand, fixed to a shaft and the shaft mounted to bring each one of the worms into engagement with the teeth of one of the gear wheels. In a normal tandem worm gear each worm serves as a thrust bearing for the other, and no thrust bearing is required for the shaft. The load equalizes itself between the two worms, so that each worm does half of the work. My present invention comprises gear wheels and worms as above described, but it also has a thrust bearing, which entirely changes its character.

In my Patent No. 1,113,172, I disclosed and claimed a tandem gear thus modified and my present invention is an improvement upon the gear shown in said patent.

The subject will be more easily understood after I have described the structure of my improved gear, so I shall proceed to describe it, referring to the accompanying drawing, in which, Figure 1 shows, partly in section, a worm gear embodying my present invention;

Figure 2 is a perspective view of a fragment of the spur gear wheels shown in Figure 1, showing one tooth of the wheel;

Figure 3 is a plan view of the tooth shown in Figure 2;

Figure 4 is a plan view of a section of a gear wheel containing several teeth, this figure being substantially diagrammatic;

Figure 5 is a diagrammatic elevation of one tooth in one of the spur gears of Figure 1, and Figure 6 is a similar view of a tooth of modified construction.

Referring now to Figure 1, two spur gear wheels, 10 and 11, are mounted for rotation, with their teeth enmeshed at 12. Below these wheels is a shaft 13, on which is fixed a right hand worm 14 and a left hand worm 15. This shaft is arranged to rotate in bearings not shown, and at 16 a fragment of the stationary base or frame by which the shaft and gears are supposed to be supported, is bored and threaded to receive a cup 17. In the cup is a thrust bearing, comprising two flat races, 18 and 19, with a plurality of balls 20 between them. The race 18 lies against the end of the shaft 13 and the race 19 lies on a pressure equalizer consisting of members 21 and 22, the latter lying in the bottom of the cup 17.

To enable the wheels 10 and 11 to mesh or cooperate with the worms, it is necessary to have oblique, or what is known as helical teeth on the wheels, and to enable two helical gear wheels to mesh with each other, as at 12, their teeth must lean in opposite directions. This in turn enables the wheels to cooperate with right and left hand worms, respectively. If the thrust bearing were omitted from Figure 1, there would remain an ordinary tandem worm gear. Adding the thrust bearing and adjusting it properly, the tandem gear is converted into the gear disclosed and claimed in the above mentioned patent. Before pointing out my present improvement I shall describe certain features of an ordinary tandem worm gear and then point out how these features are changed by the application of the thrust bearing.

Eliminating the backlash in a tandem worm gear by means of a thrust bearing, as described in said patent, changes the kinematics of the gear. It is no longer a tandem gear in the commonly accepted meaning of the term. This point will be better understood if it be considered in the light of an application of the gear to a concrete use. Tandem worm gears have been used very extensively in electric elevator machines and I shall use that as an illustration.

Suppose the shaft $10^A$ in Figure 1, upon which the wheel 10 is fixed, also had fixed to it the cable drum of an elevator. Suppose further that the arrows C and W on wheel 10 indicate the potential effect, respectively, of the weight of the elevator cab and that of the counterweight on the wheel 10. That is, let it be assumed that the weight of the cab tends to rotate the wheel 10 in the direction indicated by the arrow C, and that the counterweight tends to rotate the wheel in the direction indicated by the arrow W. The kinematics can be studied better if the shaft is assumed to be still, that is, not rotating.

Considering Figure 1 first as a normal tandem gear, disregarding the thrust bearing for the time being, it is clear that if the weight W exceeds the weight C, it will tend to rotate the wheel 10 in the direction of the hands of a clock, that is, to the right. The wheel 10 would then rotate, or tend to rotate, the wheel 11 to the left. This tendency of the wheels to rotate is checked or limited by the worms on the shaft, the wheel 10 tending to move the worm 15 to the left, while the wheel 11 tends to move the worm 14 to the right. It will be noticed that the faces of the teeth on the wheels are marked H and N, respectively. That is, each tooth has two faces, one of which is marked H and the other N. When the weight W is the heavier, the faces H of the wheel 10 cooperate with, i. e., bear against, the faces H of the wheel 11. The faces H of the wheel 10 also cooperate with the worm 15, while the faces N of the wheel 11 cooperate with the worm 14. The faces N of the wheel 10 are therefore idle. That is, they bear against neither the worm nor the teeth of gear 11. If the cab were heavier than the counterweight, tending to rotate the wheel 10 to the left, the faces N of this wheel would cooperate with the worm 15. The faces N of the wheel 10 would also cooperate with the faces N of the wheel 11 and tend to rotate the wheel 11 to the right. In this case the faces H of the wheel 11 would cooperate with the worm 14, while the faces H of the wheel 10 would be idle.

I shall now describe what happens when the shaft 13 is pushed endwise with the thrust bearing. The wheel 10 and worm 15 are shown partly in section, the section being taken in a plane coincident with the axis of the worm. Thus it is seen that the worm is substantially a rack. As the shaft 13 is pushed endwise to the right by means of the thrust bearing, the worm 15, acting as a rack, rotates, or tends to rotate, the wheel 10 to the left. At the same time the worm 14 rotates, or tends to rotate, the wheel 11 to the left. Rotating both wheels in the same direction, in the present case to the left, evidently causes the teeth to move in opposite directions at 12, where they are enmeshed. If there is no backlash in the gear the wheels 10 and 11 will only tend to rotate to the left, actual rotation being prevented by the clashing of the faces N of their teeth at 12. If there is backlash the wheels will rotate until their teeth clash at 12, after which the wheels can not rotate in either direction except when the shaft 13 rotates. They are kept from rotating to the left by the impingement of their teeth at 12, while they are prevented from rotating to the right by their respective worms. Thus the backlash is eliminated from the gear and while there will still be a tendency for the wheel 10 to rotate one way or the other, according to whether the counterweight or the cab is the heavier, movement of the wheel is prevented, as I shall now explain, in more detail.

If the counterweight be the heavier, the tendency of the wheel 10 to rotate to the right is checked by the worm 15. The faces H of the wheel 10 are lying against the threads of the worm, and since movement endwise of the worm is prevented by the thrust bearing, it is clear that the tendency for the wheel 10 to rotate to the right when the counterweight is heavier than the cab is transmitted through the teeth of wheel 10, the worm 15 and shaft 13 to the thrust bearing.

Now suppose the elevator cab be loaded, so that it is heavier than the counterweight and therefore tending to rotate the wheel 10 to the left. Since the faces N of the wheel teeth are already in contact, the tendency to rotate the wheel 10 to the left is instantly transmitted to the wheel 11 in the form of a tendency to rotate the wheel 11 to the right. As the tooth faces H of the wheel 11 are already in contact with the threads of the worm 14, the tendency to rotate the wheel 11 to the right is transmitted through the worm 14 and the shaft 13 to the thrust bearing.

Two things are now apparent: first, whether the counterweight or the cab is the heavier, in either case the tendency to rotate the wheel 10, or, what is the same thing, the tendency to prevent the wheel 10 from rotating when the shaft 13 is rotated, is transmitted to the thrust bearing. Thus the thrust bearing becomes the fulcrum through which power is transmitted from the motor to the cable drum. And this remains true whether the elevator cab is running loaded or running light, ascending or decending. Second, whatever the condition of the load may be, whether the cab is running loaded or empty, ascending or decending, only the H faces of the wheel teeth are permitted to cooperate with the worms, and only the N faces are permitted to cooperate with each other. In other words, the N faces of the gears never cooperate with the worms and the H faces never cooperate with each other. Thus I am enabled to make the N faces of the teeth of a form best adapted to cooperate with each other, and to make the H faces of a form best adapted to cooperate with a worm. This is my present improvement.

While other forms of gear teeth are adapted to mesh with each other and maintain theoretically correct tooth action, I prefer the well known involute tooth for this purpose. The drawings therefore show involute teeth. While it is possible to drive a gear wheel having regular involute teeth with a worm, it is not practicable. Experience has shown that the teeth should be hobbed, so as to provide an area on the tooth face especially adapted to cooperate with a worm. In Figures 2 and 3 I show teeth in which the face N is the regular or normal involute, while the other face has a hobbed area marked H. In Figure 1 the tooth faces marked N are normal involutes, while the tooth faces marked H are hobbed, and since the thrust bearing causes the N faces to cooperate exclusively with each other and the H faces to cooperate exclusively with the worms, it is seen that each form of tooth face is confined to its own particular sphere of action. Thus my improvement eliminates an objectionable feature of the ordinary tandem worm gear. This I shall now explain.

To enable the teeth of the wheels of a tandem gear to mesh with the worms the teeth are made oblique, and since their obliquity must be diverse, so one can mesh with a right hand and the other with a left hand worm, their teeth are enabled to mesh together and they constitute what is known as helical gears. If the faces of two enmeshed helical gear wheels are wide enough, a pair of teeth will engage at the pitch line of the wheels at one side, while the preceding pair of teeth is still engaged at the pitch line at the other side of the wheels. Fig. 4 shows a fagment of a gear wheel of this kind, the dotted line, which is parallel to the axis of the wheel, crossing slightly more than one tooth and one space. Helical gears are distinguished for their smooth and noiseless operation and are extensively used where these properties are desired. The width of the faces in tandem gear wheels is not always sufficient to obtain the full benefit of the obliquity of the teeth, but it is sufficient to obtain a very large measure of benefit, and make the tooth action much smoother than that of plain spur gears, as it brings the teeth into mesh more or less close to the pitch line.

But heretofore, not only has the benefit of the helical gear wheels been lost in tandem gears, but the operation of the wheels has been less smooth than if they were ordinary spur gear wheels. This is because of the teeth being hobbed. In Fig. 3 the surface H is a very good illustration of the appearance of the area which is formed on the face of each tooth to prepare the tooth to cooperate with the worm. It will be noticed that the surface H is depressed, that is, lower than the normal tooth face. Where both faces of the teeth in each gear are hobbed, each time two hobbed areas come together at the intermeshing point 12 (Fig. 1) a slight jolt occurs. To appreciate this it must be recalled that the teeth of helical gear wheels do not engage clear across the faces of the wheels at the same time. They contact at only a single narrow point, which point of contact moves across the faces of the wheels. Two teeth first come into engagement at one side of the wheels and as the teeth advance the contact of the teeth gradually approaches the other side, but at the same time the portions which have previously contacted separate. Therefore when the two hobbed areas come together no other parts of the teeth are in contact, and as these areas are depressed, a jolt is inevitable. The rapid recurrence of this as the teeth of the rapidly rotating gears come successively into engagement results in vibration which it is the principal object of my invention to avoid.

The advantage of keeping the tooth faces which cooperate at 12 (Fig. 1) normal, i. e., without hobbed areas is now obvious. Each pair of teeth in the gear wheels remains in uniform normal cooperation from the time it assumes carriage of a load until it yields this duty to the next pair of teeth. At the same time the tooth faces which are cooperating with the worms are of a form best suited to that purpose, although unsuited to cooperation with each other.

Another valuable feature in my improved worm gear is that of using short teeth on the gear wheels to cooperate at 12, while using worms with high threads, thereby making the area H as large as is practicable. Since the tooth action is confined to the pitch line of the toothed wheels or at least to the vicinity of the pitch line, it is unnecessary to use very long teeth on the wheels. On the other hand, I prefer larger worm areas H than can be hobbed on the faces of short teeth. So I hob down into the body of the wheel, below the "whole depth line" of the short teeth. This is shown at 25 in Figures 2, 3 and 4. It is also seen in Figure 1. In Figure 5 the normal tooth outline is shown with full lines, and by a dotted line 26 is shown the bottom of the hobbed area H. The bottom of the depression 25 hobbed in the body of the wheel is also shown by a dotted line. In order to bring the working pressure of the worm closer to the roots of the teeth I use different pitch lines for the tooth faces H and N. In Figure 5 the full line 27 is the pitch line for the normal teeth of the wheels 10 and 11. That is, the tooth faces N operate on the pitch line 27, while the dotted line 28 is the pitch line on which the hobbed areas H function. The pitch of the worms is equal to the circular pitch of the teeth measured on the line or circle 28. Figure 6 is a diagram of a tooth of the usual length, having a hobbed area equal to the hobbed area of the tooth shown in Figure 5. A pressure line 29 is drawn in each figure, normal to the hobbed areas at its pitch line, and it is seen that the distance from the point where this pressure line crosses the opposite face of the tooth in Figure 5 is about two-thirds of the corresponding distance in Figure 6. Thus the advantage of the structure shown in Figures 1 to 5 inclusive is well illustrated. It is not to be understood, however, that my invention is limited to this construction, for, in fact, the tooth can be constructed as in Figure 6.

Other modifications may be made in structural details without departure from the spirit of of my invention. The principal feature of my invention resides in making the teeth of gear wheels used in tandem worm gears with faces of different forms, one form being especially adapted to cooperate with the teeth of the other wheel, and the other form especially adapted to cooperate with a worm, and providing means for preventing the tooth faces adapted to cooperate with each other from cooperating with the worms, and the tooth faces adapted to cooperate with the worms from cooperating with each other. The specific means here disclosed for effecting this result is the thrust bearing. By means of the thrust bearing the tooth faces designed to cooperate with each other may be kept substantially in contact with each other, and the faces adapted to cooperate with the worms kept substantially in contact with the worms. Thus the gear is kept free from backlash. Obviously, the parts might be pressed so tightly together by the thrust bearing as to create undue friction. This, of course, is to be avoided, and instead the thrust bearing should be so adjusted as to leave the parts perfectly free to move, even allowing a slight play between the parts, so as to leave room for a suitable film of oil between their surfaces.

Having fully described my invention and its preferred embodiment, I claim,

1. A gear wheel the teeth of which have oppositely disposed working faces of different form; one face of each tooth having a form adapting it to cooperate with a tooth in another gear wheel, the other face having a form adapting it to cooperate with a worm.

2. A helical gear wheel the teeth of which have oppositely disposed working faces of different form; one face of each tooth having a form adapting it to cooperate with a tooth in another gear wheel, the other face having a form adapting it to cooperate with a worm.

3. A gear wheel whose teeth have faces of different form, one face of each tooth being adapted to cooperate with a worm, the other face of each tooth being adapted to cooperate with the teeth of another gear mounted on an axis parallel to its own axis.

4. A worm gear comprising two helical gear wheels mounted with their teeth in mesh, the teeth of each wheel having faces of different form; one face of each tooth being of a form adapting it to cooperate with a tooth in the other gear, the opposite faces of each tooth being adapted to cooperate with a worm; a shaft having fixed thereon two worms, one right and the other left hand, said shaft being mounted for rotation, with one worm engaging the teeth of each of said wheels; and means for preventing the faces which are adapted to cooperate with each other from cooperating with the worms, and the faces adapted to cooperate with the worms from cooperating with one another.

5. A worm gear comprising two helical gear wheels mounted with their teeth in mesh, the teeth of each wheel having faces of different form; one face of each tooth being of a form adapting it to cooperate with a tooth in the other gear, the opposite faces of each tooth being adapted to cooperate with a worm; a shaft having fixed thereon two worms, one right and the other left hand, said shaft being mounted for rotation, with one worm engaging the teeth of each of said wheels; and a thrust bearing whereby the shaft is held in a position, longitudinally, which prevents the faces which are adapted to cooperate with each other from cooperating with the worms, and the faces adapted to cooperate with the worms from cooperating with each other.

6. A worm gear comprising two helical gear wheels mounted with their teeth in mesh, the teeth of each wheel having faces of different form; one face of each tooth being of a form adapting it to cooperate with a tooth in the other gear, the opposite faces of each tooth being adapted to cooperate with a worm; a shaft having fixed thereon two worms, one right and the other left hand, said shaft being mounted for rotation, with one worm engaging the teeth of each of said wheels; and a thrust bearing whereby to press the shaft longitudinally in one direction so as to keep the worms substantially in contact with the tooth faces adapted to cooperate with the worms, and the cooperating faces of the wheel teeth substantially in contact with each other.

7. A gear wheel whose teeth have faces of different form; one face of each tooth having a form adapting it to cooperate with the teeth of another gear wheel, the other face having an area adapted to cooperate with a worm, the radial dimension of the latter being larger than that of the former.

8. A gear wheel whose teeth have faces of different form; one face of each tooth having a form adapting it to cooperate with the teeth of another gear wheel, the other face having an area adapted to cooperate with a worm, the latter face extending to a substantial depth into the body of the wheel at the bottom of the spaces between the teeth.

9. A worm gear comprising two helical gear wheels mounted with their teeth in mesh, the teeth of each wheel having faces of different form; one face of each tooth being of a form adapting it to cooperate with a tooth in the other gear, the opposite faces of each tooth being adapted to cooperate with a worm; and a shaft having fixed thereon two worms, one right and the other left hand, said shaft being mounted for rotation, with one worm engaging the teeth of each of said wheels; the lineal pitch of the worms being less than the circular pitch of the gear wheels.

10. A worm gear comprising two helical gear wheels mounted with their teeth in mesh, the teeth of each wheel having faces of different form; one face of each tooth being of a form adapting it to cooperate with a tooth in the other gear, the opposite faces of each tooth being adapted to cooperate with a worm; and a shaft having fixed thereon two worms, one right and the other left hand, said shaft being mounted for rotation with one worm engaging the teeth of each of said wheels; the lineal pitch of the worms being different from the circular pitch of the gear wheels.

FRANCIS K. FASSETT.